United States Patent [19]

Wong et al.

[11] Patent Number: 4,955,071
[45] Date of Patent: Sep. 4, 1990

[54] CONVERTER CONSOLE

[75] Inventors: Soon F. Wong; Chee S. Leong; Cher Y. Ng, all of Singapore, Singapore

[73] Assignee: Motorola, Inc., Schaumburg, Ill.

[21] Appl. No.: 339,459

[22] Filed: Apr. 17, 1989

[51] Int. Cl.$^5$ .............................................. H04B 1/38
[52] U.S. Cl. ..................................... 455/90; 455/128; 455/348; 361/391
[58] Field of Search ................... 455/89, 90, 127, 128, 455/343, 347, 348, 349, 351; 361/391, 422; 340/693

[56] References Cited

U.S. PATENT DOCUMENTS

| | | | |
|---|---|---|---|
| 4,091,318 | 5/1978 | Eichler et al. | 320/2 |
| 4,792,986 | 12/1988 | Garder et al. | 455/89 |
| 4,809,360 | 2/1989 | Kraft | 361/391 |
| 4,870,702 | 9/1989 | Azzousi | 361/391 |
| 4,892,486 | 1/1990 | Gozik et al. | 455/90 |

Primary Examiner—Joseph A. Orsino
Assistant Examiner—Frank M. Scutch, III
Attorney, Agent, or Firm—Eugene A. Parsons; Daniel K. Nichols

[57] ABSTRACT

In a converter console for converting a portable radio to mobile operation, a sleeve for receiving the portable radio and improved mounting apparatus which positions the sleeve so the portable can be easily inserted and smoothly moves the sleeve into a loaded position in which the portable is connected for control by the console and for receiving power from the vehicle. The mounting apparatus holds the various contacts firmly together to prevent contact chatter. Also included are locking apparatus which prevent relative movement between the portable/sleeve and the housing to eliminate contact chatter under extreme vibration and reduce theft and improper use.

10 Claims, 6 Drawing Sheets

CONVERTER CONSOLE

The present invention pertains to a converter console for converting a portable radio to mobile operation and more specifically to a converter console in which the portable radio is fixedly engaged to prevent circuit interruptions and to allow easy installation of the portable radio.

BACKGROUND OF THE INVENTION

In general, converter consoles are utilized for charging portable radios within a vehicle and/or for converting portable radios to mobile operations so that duplicate equipment is not required. Since a portable radio might be inserted into a converter console many times each day, it is essential that the installation is easy and reliable. Further, electrical contacts between the portable radio and the console must be reliable and continuous under various conditions, including travel in rough terrain and after years of wear. Finally, prevention of theft and damage while the portable radio is contained within the console is very important.

The only known prior art is a converter console described in U.S. Pat. No. 4,091,318, entitled "Charger/Converter Console with Reel Arrangement", issued May 23, 1978 to the same assignee. That console is designed to accept various sizes (lengths) of portable radios and, therefore, does not provide the amount of theft prevention that is required. Also, since the portable radio is essentially cantilevered in the console, driving over rough terrain and excessive wear can reduce the reliability of the electrical connections.

SUMMARY OF THE INVENTION

It is an object of the present invention to provide a new and improved converter console.

It is a further object of the present invention to provide a new and improved converter console with improved reliability, ease of insertion and theft prevention.

It is a further object of the present invention to provide an improved converter console with electrical contacts that are reliable after wear, during vibration and in any type of environment.

These and other objects are realized in a converter console including a housing having power and control contacts adapted to mate with the power and control contacts of a portable radio, a portable radio receiving sleeve having first and second spaced apart mounting members affixed thereto, a first pair of guideways formed in said housing each having a generally horizontal section and having the first pair of mounting members moveably engaged therein for generally horizontal movement, a second pair of guideways formed in said housing in spaced apart relationship with said first pair of guideways including a generally C shaped section with the bight of the C shaped section being positioned nearest said first pair of guideways and having said second pair of mounting members moveably engaged therein for combined horizontal and vertical movement, the C shaped section having a lower end which defines a loaded position for said sleeve wherein the power and control contacts of said housing are engaged with the power and control contacts of a portable radio inserted in said sleeve, and the C shaped section having an upper end which defines an unloaded position wherein the portable radio is easily removable from said sleeve, and springs positioned between said housing and said sleeve for biasing said sleeve toward one of the loaded and the unloaded positions.

In an additional embodiment of the invention locking means are included wherein an elongated shaft is rotatably mounted on the housing adjacent to at least one surface on the sleeve, the shaft being rotatable between a locked and an unlocked position, and a portion is affixed to the shaft for frictionally engaging the one surface on the sleeve in the locked position of the shaft to substantially prevent movement of the sleeve relative to the housing and for disengaging the one surface in the unlocked position of the shaft.

In an additional embodiment of the invention an elongated latch is rotatably suspended from the sleeve adjacent to a stop block mounted on the housing. When the sleeve is in the loaded position one end of the latch is engaged with the stop block to substantially prevent horizontal movement of the sleeve relative to the housing. A plunger associated with a key type lock on the front panel of the console engages an inclined (wedge) shaped surface on the latch and causes the latch to rotate out of engagement with the stop block so that horizontal movement is possible.

BRIEF DESCRIPTION OF THE DRAWINGS

Referring to the drawings.

DETAILED DESCRIPTION OF THE PREFERRED EMBODIMENTS

Figure 1:
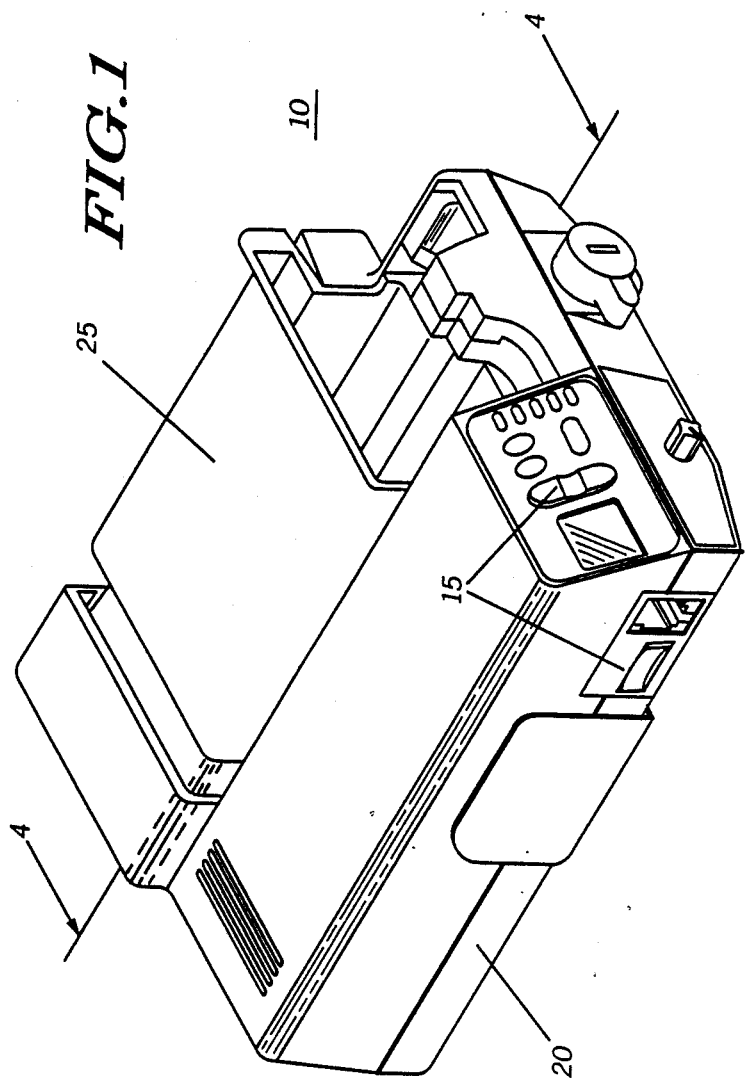
FIG. 1 is a view in perspective of a converter console embodying the present invention.
Figure 2:
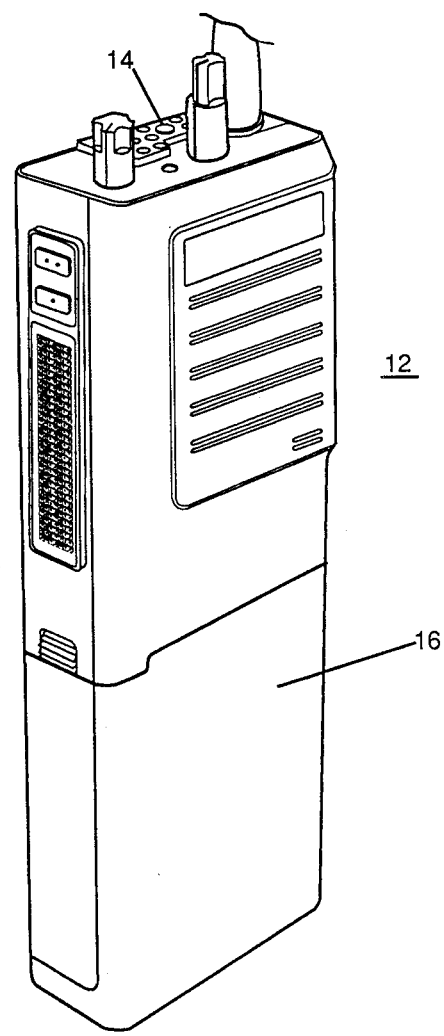
FIG. 2 is a view in perspective of a typical portable radio which may be used with the converter console of FIG. 1.
Figure 3:
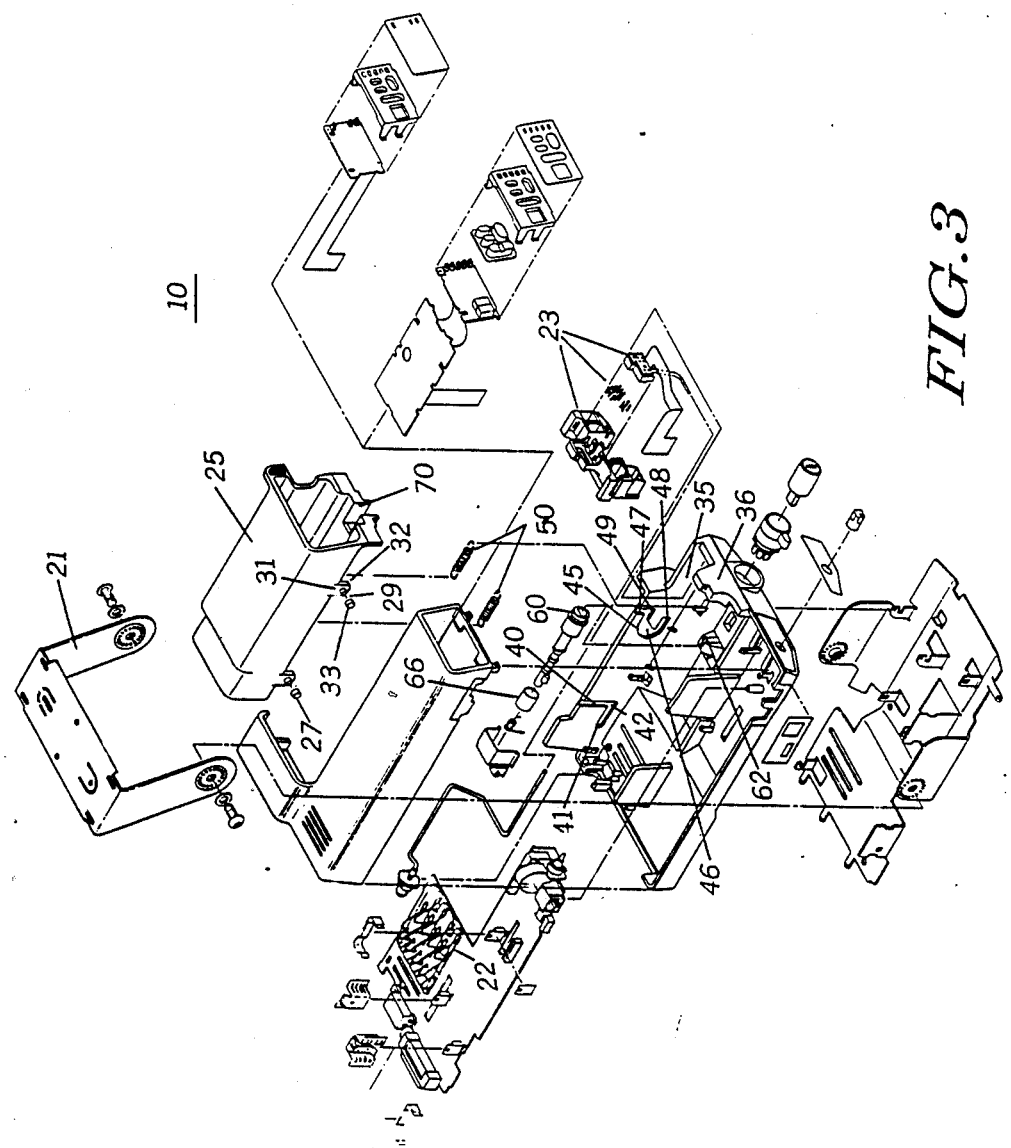
FIG. 3 is an exploded perspective view of the converter console of FIG. 1, illustrating all of the components thereof.
Figure 4:
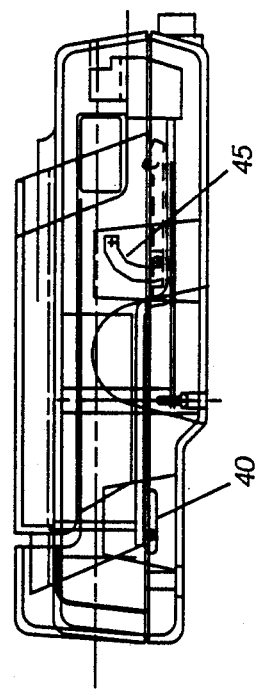
FIG. 4 is a sectional view as seen from the line 4—4 in FIG. 1.

FIGS. 1, 2 and 3 illustrate a converter console 10 embodying the present invention and a typical portable radio 12, which converter console 10 is adapted to receive portable radio 12. Portable radio 12 includes the usual controls thereon and a universal connector 14 which provides external contacts for shifting or converting control of portable radio 12 to remote controls, for example, to a remote microphone or to radio controls 15 of converter console 10. Portable radio 12 also has a battery 16 and externally accessible power contacts (not shown) through which battery 16 can be charged or replaced by the power supply of a vehicle.

Converter console 10 includes a housing 20 adapted to be mounted on a vehicle by some convenient means, such as mounting bracket 21. Housing 20 has power contacts 22 and a universal connector 23, both of which are designed to mate with the power contacts and universal connector 14, respectively, of portable radio 12. Converter console 10 further includes an elongated sleeve 25 designed to receive portable radio 12 in nesting engagement therein. Sleeve 25 has a first pair of mounting members 27 (one of which is not visible) and a second pair of mounting members 29 (one of which is not visible) affixed to the bottom thereof. In this specific embodiment, each of the mounting members includes a downwardly extending bracket 31 formed as an integral part of sleeve 25, a half or partial axle 32 fixedly attached to bracket 31 in outwardly extending relationship, and a bearing 33, which could be a fixed ring of Teflon or the like, or a wheel rotatably mounted on half axle 32. The wheel could be, for example, a small roller bearing pressfit onto half axle 32, a Teflon tire on a steel rim, or any other convenient fixed or rotatable device which will provide easy movement of sleeve 25.

Housing 20 is formed with a channel 35 extending along one side of the upper surface thereof and designed to receive sleeve 25 nestingly therein. A superstructure 36 formed as an integral part of housing 20 extends upwardly at the front end of channel 35 and is designed to receive universal connector 23 in mounting engagement therein. Channel 35 has a first pair of guideways 40 (one of which is not visible) formed in opposite sides adjacent the rear end thereof. Guideways 40 each include a generally horizontal section 41 and a section 42 communicating with section 41 and opening external to channel 35 for receiving first pair of mounting members 27 in movable engagement therein. Channel 35 has a second pair of guideways 45 (one of which is not visible) formed in opposite sides adjacent the front end thereof. Guideways 45 each include a generally C shaped section 46 and a section 47 communicating with section 46 and opening external to channel 35 for receiving second pair of mounting members 29 in movable engagement therein. C shaped sections 46 positioned with the bight of the C nearest to first guideways 40. Further, C shaped sections 46 are each connstructed with a lower end 48 which define a loaded position for sleeve 25 and an upper end 49 which define an unloaded position for sleeve 25. Although directional terms, such as "horizontal", "lower", "rearward", etc., are used throughout this specification for convenience of explanation it will be understood that these are merely relative terms and while a change in position of the converter console may change the direction of movement relative to an observer no change in the relative movement or direction between components of the converter console will occur and no change in the meaning of the claims or the explanation should be interpreted.

In the operation of converter console 10, assume sleeve 25 is in the unloaded position and empty. Bearings of second mounting members 29 are positioned in upper ends 49 of second guideways 45 and the opening of sleeve 25 is positioned above superstructure 36 for easy access. Portable radio 12 is easily inserted into sleeve 25 and sleeve 25 is easily moved rearwardly relative to housing 20. As sleeve 25 moves rearwardly, first mounting members 27 move horizontally along section 41 of guideways 40 and second mounting members 29 move horizontally and downwardly along C section 46 of guideways 45. Finally, sleeve 25 moves forward until second mounting members 29 are positioned at lower ends 48 of C sections 46. In this position universal connector 14 of portable radio 12 is in electrical engagement with universal connector 23 in superstructure 36 and the power contacts of portable radio 12 are engaged with power contacts 22 in housing 20. A pair of tension springs 50 are mounted between housing 20 and sleeve 25 to bias sleeve 25 into either the loaded or unloaded position. In the loaded position springs 50 hold universal connectors 14 and 23 tightly engaged so that no electrical breaks in the contact occur regardless of the vibration caused by rough terrain or the water on the components. Also, in the loaded position superstructure 36 extends across a substantial portion of the opening in sleeve 25 and prevents the removal of portable radio 12. It will of course be understood by those skilled in the art that the position of mounting members and guideways can be exchanged and the resulting structure will be the mechanical equivalent of the structure illustrated. Therefore, all such changes are believed to be well within the scope of the claims.

Figure 5:
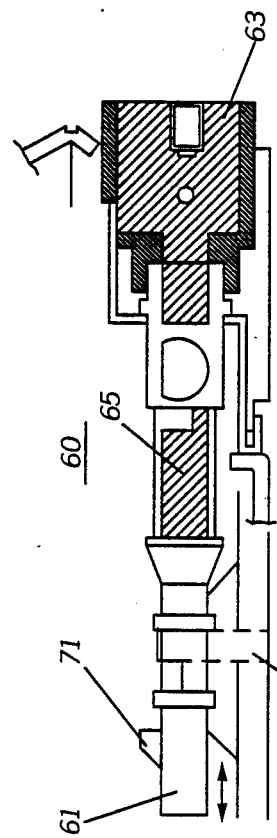
FIG. 5 is an enlarged partial sectional view of a locking mechanism, illustrating the assembly.

A locking mechanism 60 is provided in housing 20 to lock sleeve 25, and portable radio 12, in the loaded position. In this embodiment locking mechanism 60 (illustrated in larger detail in FIGS. 5, 6 and 7) includes an elongated shaft 61 rotatably mounted in housing 20 generally parallel with and below sleeve 25. A block 62 forms a bearing for the rear end of shaft 61 and the forward end is engaged by a keylock 63, which is fixedly and rotatably engaged in the front panel of housing 20 in the usual manner. As keylock 63 is rotated, shaft 61 is rotated between a locked and an unlocked position. Shaft 61 has a section 65 with a generally elliptical cross section (see FIG. 7) which is positioned with the major axis generally perpendicular to sleeve 25 when shaft 61 is in the unlocked position and the major axis rotated approximately ninety degrees when shaft 61 is in the locked position. A frictional member, which in this specific embodiment is flexible sleeve 66, is engaged over section 65, which sleeve 66 may be formed of rubber, plastic, or any material that will produce a satisfactory amount of friction. Sleeve 25 has a pair of spaced aprat parallel surfaces 70 which are positioned on opposite sides and adjacent to section 65 of shaft 61 (see FIG. 7). With shaft 61 in the unlocked position (shown in FIG. 7), sleeve 25 can be easily moved between the loaded and unloaded positions. However, when shaft 61 is rotated ninety degrees flexible sleeve 66 frictionally engages surfaces 70 and substantially prevents relative movement between sleeve 25 and housing 20. In this embodiment surfaces 70 are serrated to increase the frictional engagement with flexible sleeve 66. Thus, locking mechanism 60 further prevents any chatter and substantially reduces wear between universal connectors 14 and 23. Because of the symmetry, which improves the operation and the holding ability, two opposed surfaces and a flexible sleeve are disclosed in the present embodiment, however, it will be recognized by those skilled in the art that other configurations might be utilized, such as a single surface and a flexible projection attached to one side of a movable member.

Figure 6:
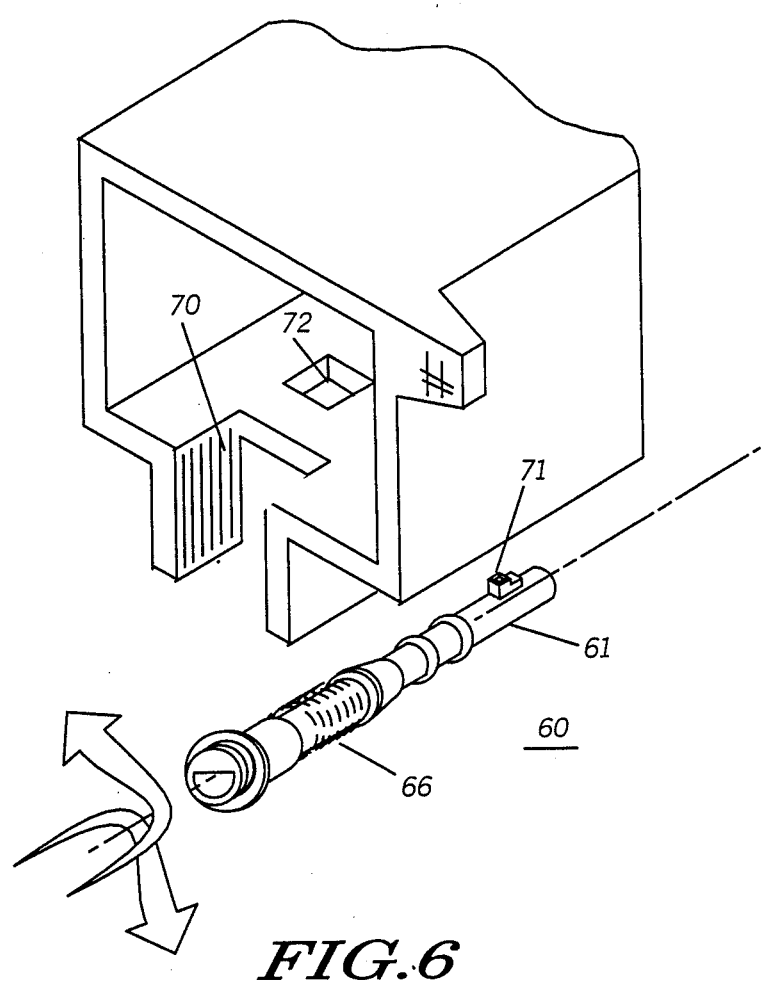
FIG. 6 is a simplified view in perspective of the locking mechanism of FIG. 5, illustrating the relationship to the console of FIG.1.
Figure 7:
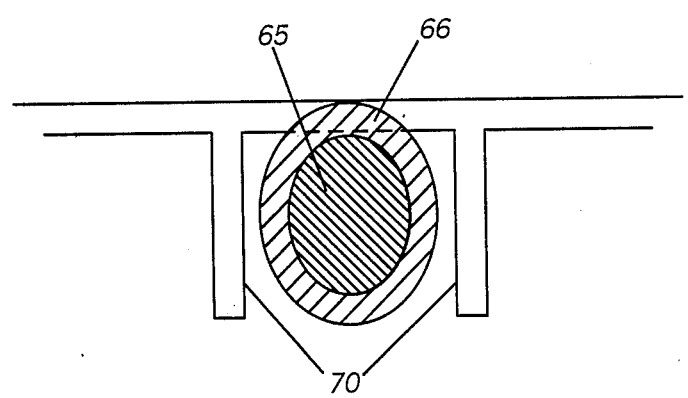
FIG. 7 is a simplified sectional view of portions of the structure in FIG. 6.

In addition, to aid in preventing theft, a generally radially extending projection 71 is formed on shaft 61 adjacent the rear end thereof and a mating opening 72 is formed in the surface of sleeve 25 (see FIG. 6). Projection 71 is positioned so as to extend into and engage an edge of opening 72 when shaft 61 is rotated into the locked position. When shaft 61 is in the unlocked position projection 71 is positioned so as to extend outwardly to one side and, thus, does not engage opening 72. Thus, locking mechanism 60 provides the dual function of preventing chatter in electrical contacts due to vibration and the like and also securely locks sleeve 25 in the loaded position, since sleeve 25 must be moved horizontally rearwardly before it can be moved into the unloaded position.

Figure 8:
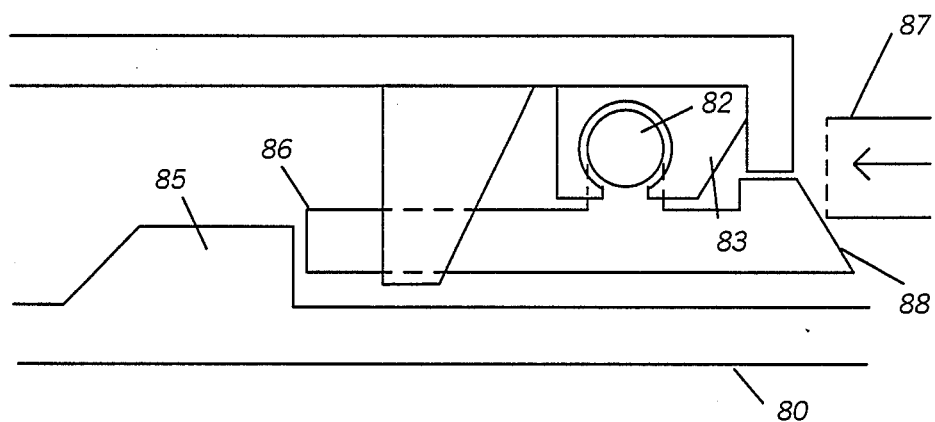
FIG. 8 is a simplified drawing of another locking mechanism embodying the present invention.
Figure 9:
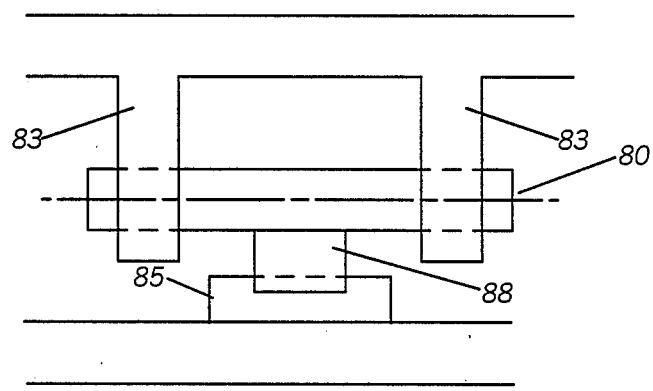
FIG. 9 is an elevational view, as seen from the position of the plunger.

Referring to FIGS. 8 and 9, another locking mechanism 80 embodying the present invention is illustrated in simplified form. Components in this embodiment which are similar to components in the previous embodiment are designated with similar numbers and a prime is added to indicate the different embodiment. Locking mecahnism 80 includes an elongated latch 81 rotatably affixed to the underside of sleeve 25' by means of axle 82. Axle 82 is mounted by a pair of bearing blocks 83 so as to extend from side-to-side of sleeve 25', perpendicular to the direction of movement thereof. A block 85 is affixed to, or formed integrally with, housing 20' so as to extend upwardly into engagement with the rear end 86 of latch 81 when it is in a horizontal position (shown in FIG. 8). In this position block 85 prevents horizontal movement of latch 81, and, thus, sleeve 25'. A plunger 87 is operatively affixed to a key lock (not shown) so as to assume the position illustrated in FIG. 8 when locked and to move a short distance toward latch 81 when unlocked. When plunger 87 moves horizontally toward latch 81, the end of plunger 87 engages an inclined or wedge-shaped surface 88 on the front end of latch 81. Surface 88 is positioned so that engagement by plunger 87 causes downward movement, which results in latch 81 rotating in a clockwise direction (in FIG. 8) and rear end 86 being disengaged from block 85. Latch 81 can then slide up and over block 85 as sleeve 25' moves from the loaded to the unloaded position.

Thus, a converter is disclosed and illustrated which conveniently and easily converts a portable radio to mobile operation by receiving the portable radio in a sleeve and moving the sleeve into a loaded position wherein the portable radio is connected to remote controls located on the converter console and to the mobile power supply. The mechanism mounting the sleeve is designed to hold the portable radio, and the sleeve, firmly in the loaded position and in engagement with the electrical contacts. Further, the sleeve is mounted to easily receive the portable radio therein and to move with little difficulty between the unloaded and the loaded positions. In addition, locking mechanisms are disclosed and illustrated which aid in firmly holding the portable radio in engagement with the various electrical contacts to prevent chatter and wear. The locking mechanism also cooperates with the sleeve to greatly improve the prevention of theft and misuse.

While we have shown and described specific embodiments of the present invention, other improvements and modifications may occur to those skilled in the art. We desire it to be understood, therefore, that this invention is not limited to the particular forms shown and we intend in the appended claims to cover all modifications which do not depart from the spirit and scope of this invention.

What is claimed is:

1. A converter console for converting to mobile operation a portable radio, having externally accessible power contacts and a universal connector for connecting remote controls thereto, said converter console comprising:

a housing including power contacts designed to mate with the power contacts of the portable radio and radio controls connected to a universal connector designed to mate with the universal connector of the portable radio;

a portable radio receiving sleeve having first and second pairs of spaced apart mounting members affixed thereto;

a first pair of guideways formed in said housing including a generally horizontal section and having the first pair of mounting members movably engaged therein for generally horizontal movement;

a second pair of guideways formed in said housing in spaced apart relationship with said first pair of guideways including a generally C shaped section with the bight of the C shaped section being positioned nearest said first pair of guideways and having said second pair of mounting members movably engaged therein for combined horizontal and vertical movement, the C shaped section having a lower end which defines a loaded position for said sleeve wherein the universal connector of a portable radio positioned within said sleeve is mated with the universal connector of said housing and the power contacts of the portable radio are mated with the power contacts of said housing and the C shaped section having an upper end which defines an unloaded position wherein the portable radio is easily removable from said sleeve; and springs positioned between said housing and said sleeve for biasing said sleeve toward one of the loaded and the unloaded positions.

2. A converter console as claimed in claim 1 wherein the first and second pairs of mounting members each include a rotatably mounted wheel designed to roll on at least one surface of the guideway in which it is movably engaged.

3. A converter console as claimed in claim 1 wherein each of the first pair of guideways has an externally opening section communicating with the generaly horizontal section for removing the first pair of mounting members from engagement therein and each of the second pair of guideways has an externally opening section communicating with the C shaped section for removing the second pair of mounting members from engagement therein.

4. A converter console as claimed in claim 1 including in addition a locking mechanism for holding the sleeve in the loaded position.

5. A converter console for converting to mobile operation a portable ratio, having externally accessible power contacts and a universal connector for connecting remote controls thereto, said converter console comprising:

a housing including power contacts designed to mate with the power contacts of the portable radio and radio controls connected to a universal connector designed to mate with the universal connector of the portable radio;

a portable radio receiving sleeve having at least one surface;

mounting mechanism affixing said sleeve to said housing in an unloaded position in which a portable radio is readily received in said sleeve and movable to a loaded position in which said portable radio is fixedly engaged in said sleeve with the power contacts of said portable radio in engagement with the power contacts of said housing and the universal connector of said portable radio in engagement with the universal connector of said housing;

an elongated shaft mounted on said housing adjacent the one surface of said sleeve, said shaft being movable between a locked position and an unlocked position; and a frictional member affixed to said shaft for frictionally engaging the one surface of said sleeve when said shaft is moved into the locked position and for disengaging the one surface of the sleeve when said shaft is moved into the unlocked position.

6. A converter console as claimed 5 claim wherein the one surface of the sleeve is serrated to increase the frictional engagement between the frictional member and the one surface of the sleeve.

7. A converter console as claimed in claim 5 wherein the shaft is mounted for rotation and includes a generally elliptical section mounted so that the major axis of the elliptical section is positioned generally parallel to the one surface when the shaft is rotated into the unlocked position and is generally perpendicular to the one surface when the shaft is rotated into the locked position and the frictional member is a flexible sleeve positioned in surrounding engagement over said elliptical section.

8. A converter as claimed in claim 7 wherein the sleeve has a second surface positioned in generally parallel relationship to the one surface of the sleeve, with the one surface and the secoond surface being spaced apart so that the flexible sleeve frictionally engages the second surface and the one surface approximately equally when the shaft is rotated into the locked position.

9. A converter console as claimed in claim 8 including in addition a generally radially extending projection integrally attached to the shaft and an opening formed in the sleeve adjacent to said shaft, said radially extending projection being received in the opening to substantially prevent horizontal movement of said sleeve when said shaft is rotated into the locked position and said radially extending projection being free of the opening to allow horizontal movement of said sleeve when said shaft is rotated into the unlocked position.

10. A converter console for converting to mobile operation a portable radio, having externally accessible power contacts and a universal connector for connecting remote controls thereto, said converter console comprising:

a housing including power contacts designed to mate with the power contacts of the portable radio and radio controls connected to a universal connector designed to mate with the universal connector of the portable radio;

a portable radio receiving sleeve;

mounting mechanism affixing said sleeve to said housing in an unloaded position, in which a portable radio is readily received in said sleeve, and movable to a loaded position, in which said portable radio is fixedly engaged in said sleeve with the power contacts of said portable radio in engagement with the power contacts of said housing and the universal connector of said portable radio in engagement with the universal connector of said housing;

a latch attached to said sleeve and movable between a locked and an unlocked position, said latch having a locking surface and an inclined surface;

a block affixed to said housing so as to be engaged by the locking surface of said latch when said latch is in the locked position and prevent movement of said sleeve from the loaded position to the unloaded position; and a plunger movably mounted in said housing for engaging the inclined surface of said latch and moving said latch from the locked to the unlocked position wherein the locking surface of said latch is disengaged from said block and the sleeve is free to move from the loaded to the unloaded position.

* * * * *